US006307553B1

(12) United States Patent
Abdallah

(10) Patent No.: US 6,307,553 B1
(45) Date of Patent: *Oct. 23, 2001

(54) SYSTEM AND METHOD FOR PERFORMING A MOVHPS-MOVLPS INSTRUCTION

(76) Inventor: Mohammad Abdallah, 1009 Folsom Ranch Dr., #203, Folsom, CA (US) 94630

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,001

(22) Filed: Mar. 31, 1998

(51) Int. Cl.[7] ..................................................... G06T 1/00
(52) U.S. Cl. .......................... 345/419; 712/220; 712/221; 712/222
(58) Field of Search ..................... 345/419; 712/220–222

(56) References Cited

PUBLICATIONS

Sun Microsystems Inc. Technology White Paper: The UltraSPARC Architecture, Nov. 1995.*
Visual Instruction Set User's Guide, Mar. 1997.*
Sun Microsystems, "Visual Instruction Set User's Guide", Mar. 1997.
Tri Media, "TM 1000 Preliminary Data Book", Phillips Electronics North America Corporation, 1997.
Wang, Mangaser, Srinivasan, "A Processor Architecture for 3D Graphics Calculations", Computer Motion Inc., Goleta, CA.
Abott, Massalin, Peterson, Karzes, Yamano, Kellogg, "Broadband Algorithms with the MicroUnity Mediaprocessor", Proceedings of Compcon, IEEE, 1996, pp. 349–354.
Advanced Micro Devices, Inc., "AMD–3D Technology Manual", Feb., 1998.
Hansen, Craig, "Architecture of a Broadband Mediaprocessor", Proceedings of Compcon, IEEE, 1996, pp. 334–340.
Hayes, Loyola, Abott, Massalin, "MicroUnity Software Development Environment", Proceedings of Compcon, IEEE, 1996, pp. 341–348.
Levinthal, Hanrahan, Paquette, Lawson, "Parallel Computers for Graphics Applications", Proceedings of: ASPLOS II, IEEE, 1987, pp. 193–198.
Levinthal and Porter, "Chap–A SIMD Graphics Processor", Computer Graphics Project,, ACM, vol. 18, No. 3, Jul. 1984, pp. 77–81.

* cited by examiner

Primary Examiner—Mark R. Powell
Assistant Examiner—Lance W. Sealey

(57) ABSTRACT

An apparatus and method for performing a MOVHPS-MOVLPS operation on packed data using computer-implemented steps is described. In one embodiment, a first packed data operand having a pair of data elements is accessed. A second packed data operand having two pairs of data elements is then accessed. One of the two pairs of data elements in the second packed data operand is replaced with the pair of data elements in the first packed data operand.

10 Claims, 6 Drawing Sheets

SYSTEM AND METHOD FOR PERFORMING A MOVHPS-MOVLPS INSTRUCTION

FIELD OF THE INVENTION

The present invention relates in general to the field of computer systems, and in particular, to an apparatus and method for performing multidimensional computations based on a MOVHPS-MOVLPS operation.

BACKGROUND OF THE INVENTION

To improve the efficiency of multimedia applications, as well as other applications with similar characteristics, a Single Instruction, Multiple Data (SIMD) architecture has been implemented in computer systems to enable one instruction to operate on several operands simultaneously, rather than on a single operand. In particular, SIMD architectures take advantage of packing many data elements within one register or memory location. With parallel hardware execution, multiple operations can be performed with one instruction, resulting in significant performance improvement.

Although many applications currently in use can take advantage of such vertical operations, there are a number of important applications which would require the rearrangement of the data elements before vertical operations can be implemented so as to provide realization of the application. Examples of such important applications include the dot product and matrix multiplication operations, which are commonly used in 3-D graphics and signal processing applications.

Therefore, there is a need for providing an apparatus and method for efficiently performing vertical SIMD computations.

SUMMARY OF THE INVENTION

The present invention provides an apparatus and method for performing a MOVHPS-MOVLPS operation on packed data using computer implemented steps is described. In one embodiment, a first packed data operand having a pair of data elements is accessed. A second packed data operand having two pairs of data elements is then accessed. One of the two pairs of data elements in the second packed data operand is replaced with the pair of data elements in the first packed data operand.

DESCRIPTION OF THE DRAWINGS

The present invention is illustrated by way of example and may be better understood by referring to the following description in conjunction with the accompanying drawings, in which like references indicate similar elements and in which.

DETAILED DESCRIPTION OF A PREFERRED EMBODIMENT OF THE PRESENT INVENTION

In the following description, numerous specific details are set forth to provide a thorough understanding of the invention. However, it will be understood by one of ordinary skill in the art that the invention may be practiced without these specific details. In other instances, well-known circuits, structures and techniques have not been shown in detail in order not to obscure the invention.

According to one aspect of the invention, a method and apparatus are described for moving data elements in a packed data operand (a MOVHPS-MOVLPS operation). The MOVHPS-MOVLPS operations allow, for example, the partial update of a 128-bit packed register from memory, and the partial store of the 128-bit register into 64-bit memory. This allows the upper half or lower half of the register/memory to be bypassed to destination without modification. This has the benefit of 1) potentially achieving the same performance when updating a 128-bit register or memory as a packed instruction implementation, and 2) providing the flexibility of loading into the packed register from different 64-bit memory locations all storing from two different packed memory locations. The two halves of the 128-bit register may be assembled with the same performance as the packed instruction which loads or stores an entire 128-bit register to/from a unified 128-bit memory location. Being able to access a 64-bit quantity, rather than a full 128-bit quantity, is also useful when reorganizing data formats.

The term "registers" is used herein to refer to the on-board processor storage locations that are used as part of macro-instructions to identify operands. In other words, the registers referred to herein are those that are visible from the outside of the processor (from a programmers perspective). However, the registers described herein can be implemented by circuitry within a processor using any number of different techniques, such as dedicated physical registers, dynamically allocated physical registers using register renaming, combinations of dedicated and dynamically allocated physical registers, etc.

COMPUTER SYSTEM

Figure 1:
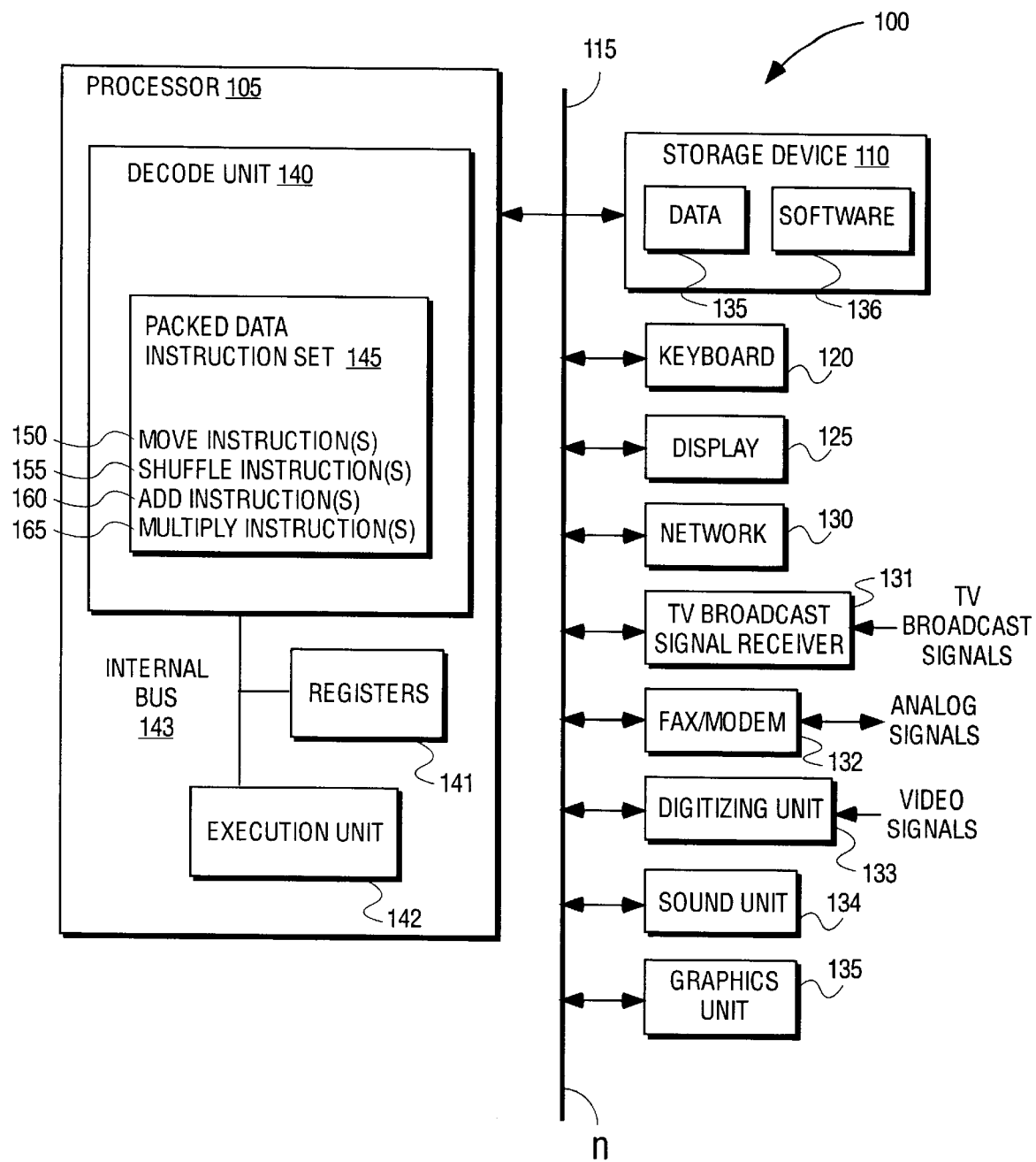
FIG. 1 illustrates an exemplary computer system in accordance with one embodiment of the invention.

FIG. 1 illustrates one embodiment of a computer system 100 which implements the principles of the present invention. Computer system 100 comprises a processor 105, a storage device 110, and a bus 115. The processor 105 is coupled to the storage device 110 by the bus 115. In addition, a number of user input/output devices, such as a keyboard 120 and a display 125, are also coupled to the bus 115. The processor 105 represents a central processing unit of any type of architecture, such as CISC, RISC, VLIW, or hybrid architecture. In addition, the processor 105 could be implemented on one or more chips. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. The bus 115 represents one or more buses (e.g., AGP, PCI, ISA, X-Bus, VESA, etc.) and bridges (also termed as bus controllers). While this embodiment is described in relation to a single processor computer system, the invention could be implemented in a multi-processor computer system. In addition, while this embodiment is described in relation to a 64-bit computer system, the invention is not limited to a 64-bit computer system.

In addition to other devices, one or more of a network 130, a TV broadcast signal receiver 131, a fax/modem 132, a digitizing unit 133, a sound unit 134, and a graphics unit 135 may optionally be coupled to bus 115. The network 130 and fax modem 132 represent one or more network connections for transmitting data over a machine readable media (e.g., carrier waves). The digitizing unit 133 represents one or more devices for digitizing images (i.e., a scanner, camera, etc.). The sound unit 134 represents one or more devices for inputting and/or outputting sound (e.g., microphones, speakers, magnetic storage devices, optical storage devices, etc.). The graphics unit 135 represents one or more devices for generating 3-D images (e.g., graphics card).

FIG. 1 also illustrates that the storage device 110 has stored therein data 135 and software 136. Data 135 represents data stored in one or more of the formats described herein. Software 136 represents the necessary code for performing any and/or all of the techniques described with reference to FIG. 3–6. It will be recognized by one of ordinary skill in the art that the storage device 110 preferably contains additional software (not shown), which is not necessary to understanding the invention.

FIG. 1 additionally illustrates that the processor 105 includes decode unit 140, a set of registers 141, and execution unit 142, and an internal bus 143 for executing instructions. It will be recognized by one of ordinary skill in the art that the processor 105 contains additional circuitry, which is not necessary to understanding the invention. The decode unit 140, registers 141 and execution unit 142 are coupled together by internal bus 143. The decode unit 140 is used for decoding instructions received by processor 105 into control signals and/or microcode entry points. In response to these control signals and/or microcode entry points, the execution unit 142 performs the appropriate operations. The decode unit 140 may be implemented using any number of different mechanisms (e.g., a look-up table, a hardware implementation, a PLA, etc.). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the invention.

The decode unit 140 is shown including packed data instruction set 145 for performing operations on packed data. In one embodiment, the packed data instruction set 145 includes the following instructions: a move instruction(s) 150, a shuffle instruction(s) 155, an add instruction(s) (such as ADDPS) 160, and a multiply instruction(s) 165. The MOVAPS, SHUFPS and ADDPS instructions are applicable to packed floating point data, in which the results of an operation between two sets of numbers having a predetermined number of bits, are stored in a register having the same predetermined number of bits, i.e., the size or configuration of the operand is the same as that of the result register. The operation of each of these instructions is further described herein. While one embodiment is described in which the packed data instructions operate on floating point data, alternative embodiments could alternatively or additionally have similar instructions that operate on integer data.

In addition to the packed data instructions, processor 105 can include new instructions and/or instructions similar to or the same as those found in existing general purpose processors. For example, in one embodiment the processor 105 supports an instruction set which is compatible with the Intel® Architecture instruction set used by existing processors, such as the Pentium® II processor. Alternative embodiments of the invention may contain more or less, as well as different, packed data instructions and still utilize the teachings of the invention.

The registers 141 represent a storage are on processor 105 for storing information, including control/status information, integer data, floating point data, and packed data. It will be understood by one of ordinary skill in the art that one aspect of the invention is the described instruction set for operating on packed data. According to this aspect of the invention, the storage area used for storing the packed data is not critical. The term data processing system is used herein to refer to any machine for processing data, including the computer systems(s) described with reference to FIG. 1.

While one embodiment of the invention is described in which the processor 105, executing the packed data instructions operates on 128-bit packed data operands containing four 32-bit single precision floating point values, can operate on packed data in several different packed data formats. For example, in one embodiment, packed data can be operated on in one of three formats: a "packed byte" format (e.g., PADDb), a "packed word" format (e.g., PADDw), or a "packed double word" (dword) format (e.g., PADDd). The packed byte format includes eight separate 8-bit data elements; the packed word format includes four separate 16-bit data elements; the packed dword format includes two separate 32-bit data elements 16-bit data elements. While certain instructions are discussed below with reference to one or two packed data formats, the instructions may be similarly applied the other packed data formats of the invention.

Figure 2:
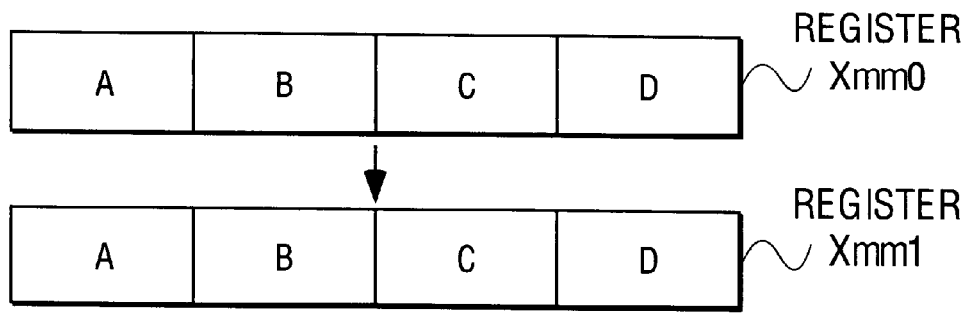
FIG. 2 illustrates the operation of the move instruction in accordance with one embodiment of the invention.

The shuffle instruction of the present invention is part of a family of many different instructions which operate with SIMD architecture. For example, FIG. 2 illustrates the operation of the move instruction 150 according to one embodiment of the invention. In this example, the move 150 (MOVAPS) moves bits of data from one register to another register or from one memory location to another. In one embodiment, 64-bits representing four packed words from one memory location to another or from one register to another.

Figure 3:
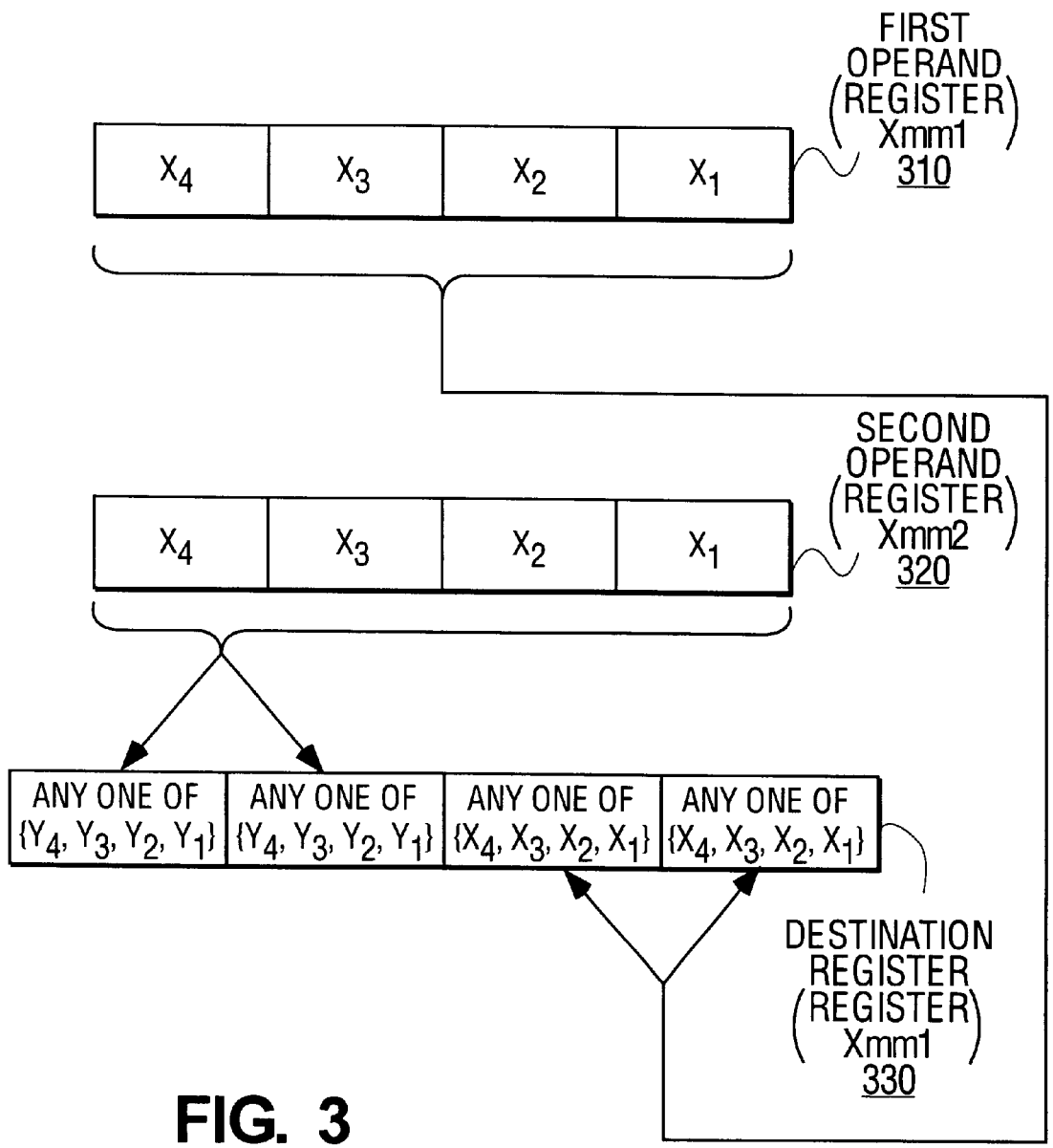
FIG. 3 illustrates the operation of the shuffle instruction in accordance with one embodiment of the invention.

FIG. 3 illustrates the operation of the shuffle instruction 155 according to one embodiment of the invention. In one embodiment, the shuffle instruction 155 (SHUFPS) is able to shuffle any one of a plurality (e.g., four) single floating point (FP) numbers from a first operand 310 to the lower two destination fields of a destination register 330; the upper two destination fields are generated from a shuffle of any one of a plurality (e.g., four) single FP numbers from a second operand 320.

Figure 4:
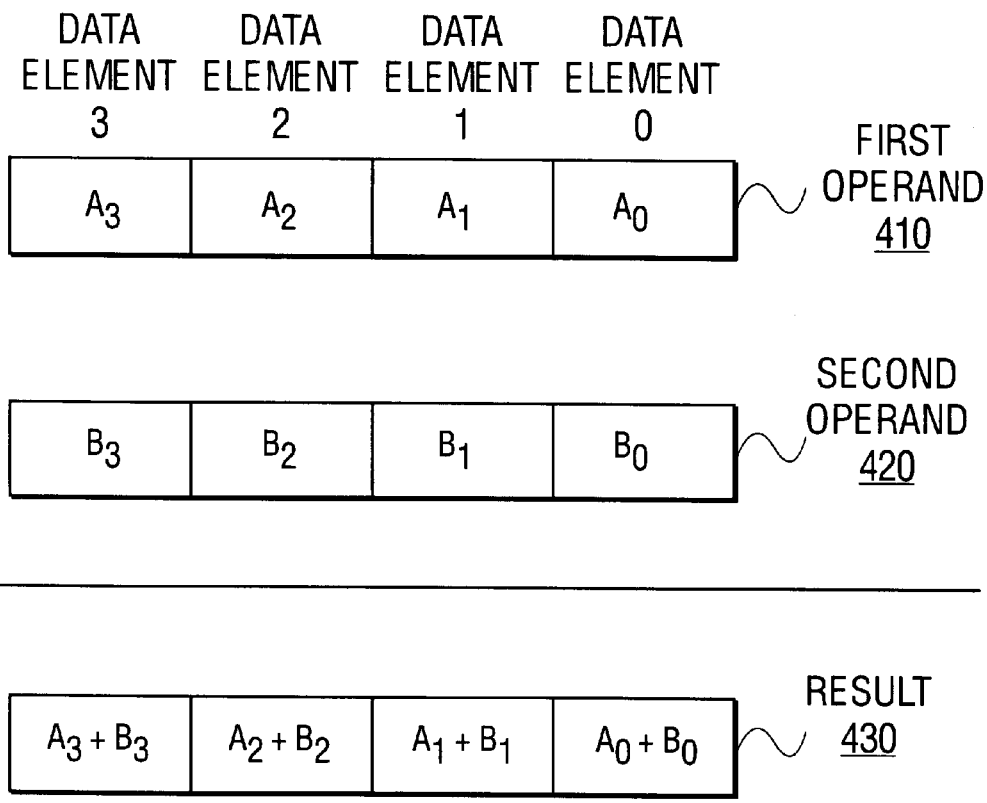
FIG. 4 illustrates the operation of the inter-add instruction in accordance with one embodiment of the invention.

FIG. 4 illustrates the operation of the packed vertical add instruction 160 according to one embodiment of the invention. In one embodiment, the packed vertical operation is the add instruction (ADDPS) 160, which operates on the data elements of a first to operand 410 and a second operand 420. In particular, the data elements of a first operand 410 are added to the respective packed data elements of a second operand 420, and are used to generate a result 430. For example, data element 0 of the first operand 410 is added to data element 0 of the second operand 420 and the result is stored as data element 0 of the result 430. The packed multiply instruction acts in a similar manner to the packed add instruction, except multiply operations are performed.

MOVHPS-MOVLPS OPERATIONS

Figure 5:
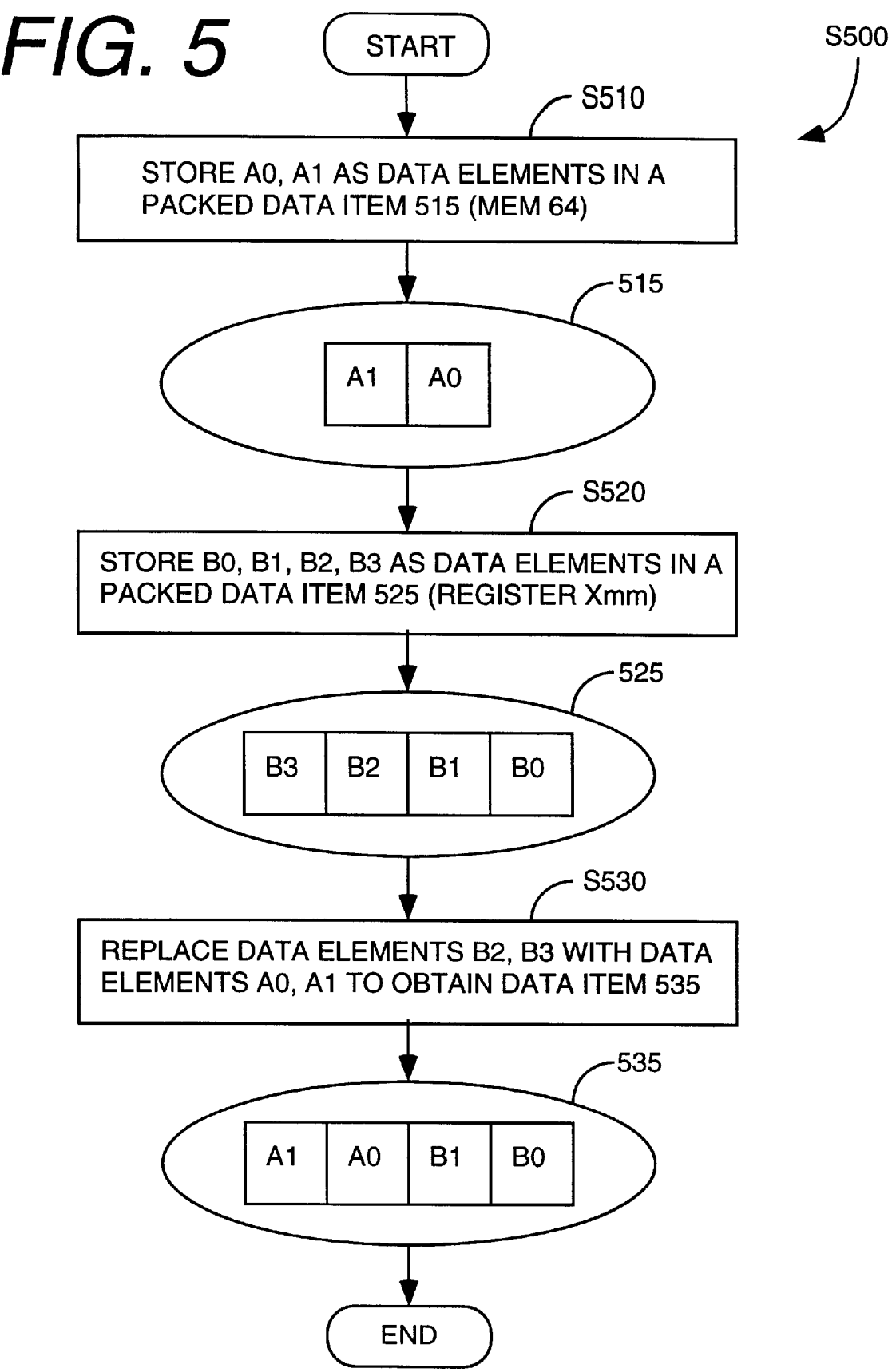
FIG. 5 illustrates the operation of the MOVHPS-MOVLPS instruction in accordance with one embodiment of the invention.

FIG. 5 illustrates a technique for performing a MOVHPS operation on two numbers according to one embodiment of the invention. In this application, data is represented by ovals, while instructions are represented by rectangles. Beginning from a start state, the process S500 proceeds to process step S510, where numbers A0 and A1 are stored as data elements in a packed data item 515. For present discussion purposes, each data element is 32-bits wide, and the operand to be moved is contained in 64 bit memory element, in the following order:

|A1|A0|

The process S500 then proceeds to process step S520, where numbers B0, B1, B2 and B3 are stored as data elements in a packed data item 525. For present discussion purposes, each data element is 32-bits wide, and the operand to be moved into is contained in register X, in the following order:

|B3|B2|B1|B0|

The process S500 then advances to process step S530, where a MOVHPS instruction is performed on the contents of the memory element (data item 515) and register X (data item 525), so as to replace data items B2 and B3 with A0 and A1. The resulting data item 535 stored in register X is as follows:

|A1|A0|B1|B0|

Accordingly, a MOVHPS operation is performed. Although FIG. 5 illustrates an example of the MOVHPS operation with data operands having four data elements, the principles of the invention may also be implemented in data operands having at least two elements. It will be recognized that the destination data elements not moved into remain unchanged and are by-passed by the MOVHPS operation. Additionally, the present invention allows the MOVHPS operation between two registers. With a register MOVHPS operation, either the high field of the source register can be moved to the high field of the destination register, or the lower field of the source register can be moved to the high field of the destination register. A prefix may be used to distinguish between these two types of register MOVHPS operations.

Figure 6:
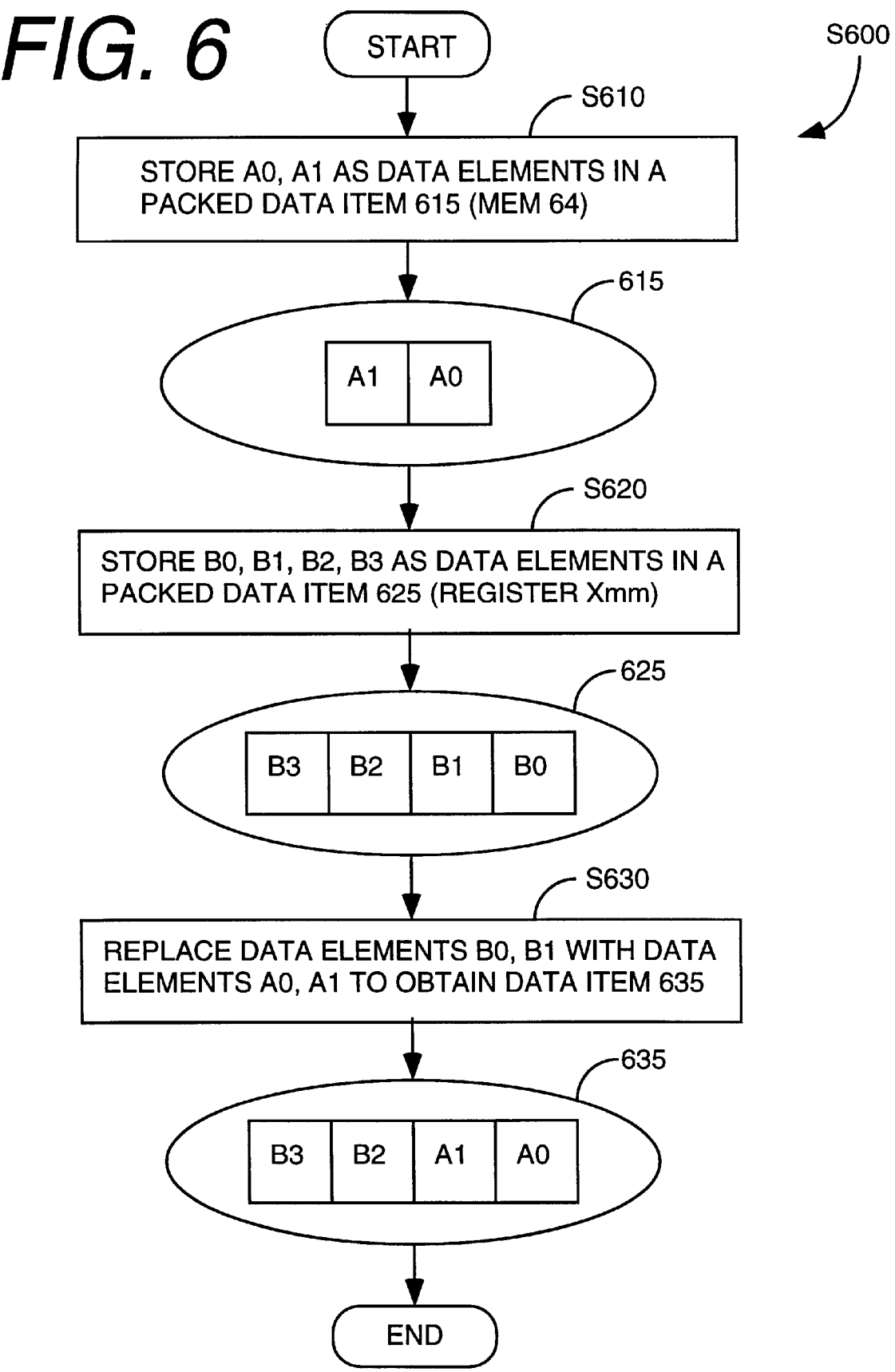
FIG. 6 illustrates the operation of the MOVHPS-MOVLPS instruction in accordance with one embodiment of the invention.

FIG. 6 illustrates a technique for performing a MOVLPS operation on two numbers according to one embodiment of the invention. In this application, data is represented by ovals, while instructions are represented by rectangles. Beginning from a start state, the process S600 proceeds to process step S610, where numbers A0 and A1 are stored as data elements in a packed data item 615. For present discussion purposes, each data element is 32-bits wide, and the operand to be moved is contained in 64 bit memory element, in the following order:

|A1|A0|

The process S600 then proceeds to process step S620, where numbers B0, E1, B2 and B3 are stored as data elements in a packed data item 625. For present discussion purposes, each data element is 32-bits wide, and the operand to be moved into is contained in register X, in the following order:

|B3|B2|B1|B0|

The process S600 then advances to process step S630, where a MOVHPS instruction is performed on the contents of the memory element (data item 615) and register X (data item 625), so as to replace data items B2 and B3 with A0 and A1. The resulting data item 635 stored in register X is as follows:

|B3|B2|A1|A0|

Accordingly, a MOVLPS operation is performed. Although FIG. 6 illustrates an example of the MOVLPS operation with data operands having four data elements, the principles of the invention may also be implemented in data operands having at least two elements. It will be recognized that the destination data elements not moved into remain unchanged and are by-passed by the MOVLPS operation. Additionally, the present invention allows the MOVLPS operation between two registers. With a register MOVLPS operation, either the lower field of the source register can be moved to the lower field of the destination register, or the high field of the source register can be moved to the lower field of the destination register. A prefix may be used to distinguish between these two types of register MOVLPS operations.

Figure 7:
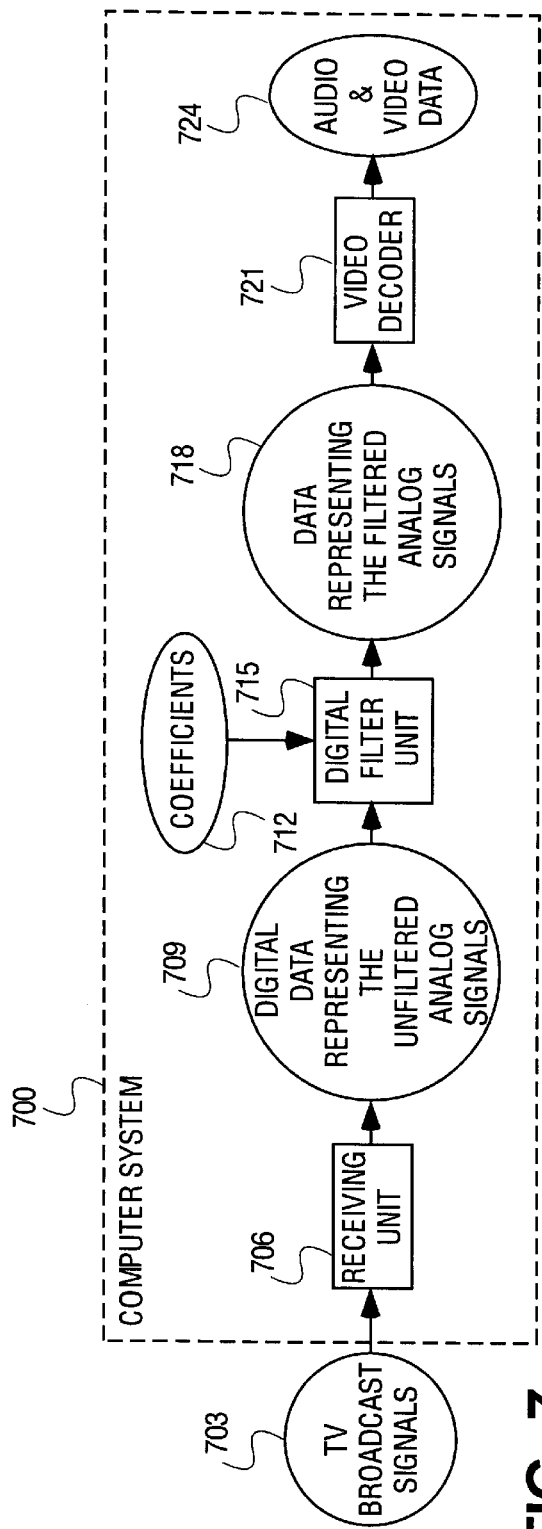
FIG. 7 is a general block diagram illustrating the usage of a digital filter which utilizes MOVHPS-MOVLPS operations, for filtering a TV broadcast signal in accordance with one embodiment of the invention.

The MOVHPS-MOVLPS instruction of the present invention may be used as part of many different applications. For example, FIG. 7 is a general block diagram illustrating the use of a digital filter which utilizes a MOVHPS-MOVLPS operation for filtering a TV broadcast signal according to one embodiment of the invention. FIG. 7 shows TV broadcast signals 703 representing a television broadcast being received by a receiving unit 706 of a computer system 700. The receiving unit 706 receives the TV broadcast signals 703 and transforms them into digital data 709. A digital filter unit 715 performs a digital filter (e.g., FIR, IIR, etc.) on the digital data 709 using a set of coefficients 712. As a result, the digital filter unit 715 generates filtered data 718 (also termed as "filtered data items") representing the filtered analog TV broadcast signals. In performing the filtering operation, MOVHPS-MOVLPS operations is implemented. The filtered data 718 is received by a video decoder 721 for conversion into and audio & video data 724. The techniques performed by video decoder 721 are well known (see Jack, Smith, Keith, "NTSC/PAL Digital Decoder", *Video Demystified*, High Text Publications, Inc., 1993) The audio and video data can be used for any purpose (e.g., display on a screen).

In one embodiment, the computer system 100 shown in FIG. 1 is used to implement the computer system 700 in FIG. 7. In this embodiment, the TV broadcast signal receiver 131 acts as the receiving unit 706 and may include a TV tuner, an analog to digital converter, and a DMA channel. The TV broadcast signals 703 are received by the TV tuner, converted into digital data by the analog to digital converter, and then sorted in the storage device 110 by the DMA channel. It will be recognized by one of ordinary skill in the art that the digital data sorted by the TV broadcast signal receiver 131 may be stored in any number of formats. For example, the TV broadcast signal receiver 131 may store the data in the main memory in one or more of the formats described herein—storing two representations of each of the components of the data such that it may be read in as packed data item in the described formats. This data may then be accessed as packed data and copied into registers on the processor 105. Since the data is stored in the disclosed formats, the processor 105 can easily and efficiently perform the MOVHPS-MOVLPS operation as described with reference to FIG. 5 and FIG. 6. It will be recognized by one of ordinary skill in the art that the receiving unit 706 may encompass additional hardware, software, and/or firmware in the TV broadcast signal receiver 131 or software executing on the processor 105. For example, additional software may be sorted in the storage device 110 for further processing the data prior to the digital filter being performed.

In this embodiment, the digital filter unit 718 is implemented using the processor 105 and the software 136 to perform the a digital filter. In this embodiment, the processor 105, executing the software 136, performs the digital filter using MOVHPS-MOVLPS operations, and stores the filtered data 718 in storage device 110. In this manner, the digital filter is performed by the host processor of the computer system, rather than the TV broadcast signal receiver 131. As a result, the complexity of the TV broadcast signal receiver 131 is reduced. In this embodiment, the video decoder 721 may be implemented in any number of different combinations of hardware, software, and/or firmware. The audio and video data 724 can then be sorted, and/or displayed on the display 125 and the sound unit 134, respectively.

Figure 8:
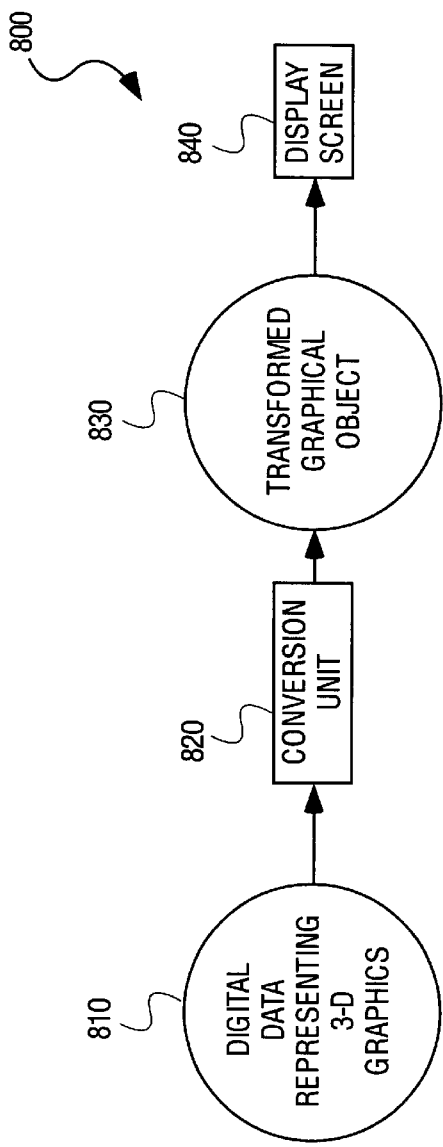
FIG. 8 is a general block diagram illustrating the use of MOVHPS-MOVLPS operations, in rendering graphical objects in animation.

FIG. 8 is a general block diagram illustrating the use of a MOVHPS-MOVLPS operation for rendering graphical objects in animation according to one embodiment of the invention. FIG. 8 shows a computer system 800 containing digital data 755 representing 3-dimensional (3D) graphics. The digital data 810 may be stored on a CD ROM or other type of storage device for later use. At sometime, the conversion unit 760 performs alteration of data using 3D geometry which includes the use of a MOVHPS-MOVLPS operation to manipulate (e.g., scale, rotate, etc.) a 3D object in providing animation. The resulting graphical object 830 is then displayed on a screen display 840. The resulting graphical object may also be transmitted to a recording device (e.g., magnetic storage, such as tape).

In one embodiment, the computer system 100 shown in FIG. 1 is used to perform the 30 graphics operation 800 from FIG. 8. In this embodiment, the digital data 810 from FIG. 8 is any data stored in the storage device 110 representing 3D graphics. In one embodiment, the conversion unit 820 from FIG. 8 is implemented using the processor 105 and the software 136 to alter data using 3D geometry. An example of such alteration of data includes the performance of a 3D transformation. In this embodiment, the processor 105, executing the software 136, performs the transformation and stores the transformed data 830 in the storage device 110 and/or provide, the transformed data to the graphics unit 135. In this manner, the 3D manipulation performed by the host processor of the computer system is provided at an increased speed. The present invention thus facilitates the performance of a MOVHPS-MOVLPS operation through the use of available instruction sequences.

While several examples uses of MOVHPS-MOVLPS operations have been described, it will be understood by one of ordinary skill in the art that the invention is not limited to these uses. In addition, while the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A computer system comprising:
    a hardware unit to transmit data representing graphics to another computer or a display;
    a processor coupled to the hardware unit; and
    a storage device coupled to the processor and having stored therein a routine, which when executing by the processor, causes the processor to generate the data, the routine at least causing the processor to at least,
        access a first packed data operand having a pair of data elements;
        access a second packed data operand having two pairs of data elements; and
        replace one of the two pairs of data elements in the second packed data operand with the pair of data elements in the first packed data operand.

2. The computer system of claim 1 wherein the storage device further comprises a packing device for packing floating point data into the data elements.

3. The computer system of claim 1 wherein the storage device further comprises a packing device for packing integer data into the data elements.

4. A computer-implemented method comprising the computer-implemented steps of:
    decoding a single instruction;
    in response to the step of decoding the single instruction,
        accessing a first packed data operand having a pair of data elements;
        accessing a second packed data operand having two pairs of data elements; and
        completing the execution of the single instruction by replacing one of the two pairs of data elements in the second packed data operand with the pair of data elements in the first packed data operand.

5. The method of claim 4 further comprising packing floating point data into the data elements.

6. The method of claim 4 further comprising packing integer data into the data elements.

7. A method comprising:
    accessing data representative of a first three-dimensional image;
    altering the data using three-dimensional geometry to generate a second three-dimensional image, the altering at least including,
        accessing a first packed data operand having a pair of data elements;
        accessing a second packed data operand having two pairs of data elements;
        replacing one of the two pairs of data elements in the second packed data operand with the pair of data elements in the first packed data operand; and
    displaying the second three-dimensional image.

8. The method of claim 7 wherein the altering includes the performance of a three-dimensional transformation.

9. The method of claim 8 wherein the altering includes the step of packing floating point data into the data elements.

10. The method of claim 8 wherein the altering includes the step of packing integer data into the data elements.

* * * * *

UNITED STATES PATENT AND TRADEMARK OFFICE
CERTIFICATE OF CORRECTION

PATENT NO.    : 6,307,553 B1
DATED         : October 23, 2001
INVENTOR(S)   : Abdallah It is certified that error appears in the above-identified patent and that said Letters Patent is hereby corrected as shown below:

Column 4,
Line 41, after "In this example, the move", insert -- instruction --

Signed and Sealed this

Twelfth Day of November, 2002

Attest:

Attesting Officer

JAMES E. ROGAN
Director of the United States Patent and Trademark Office